J. T. LYNAM.
Grain Drill.
No. 83,517.
Patented Oct. 27, 1868.
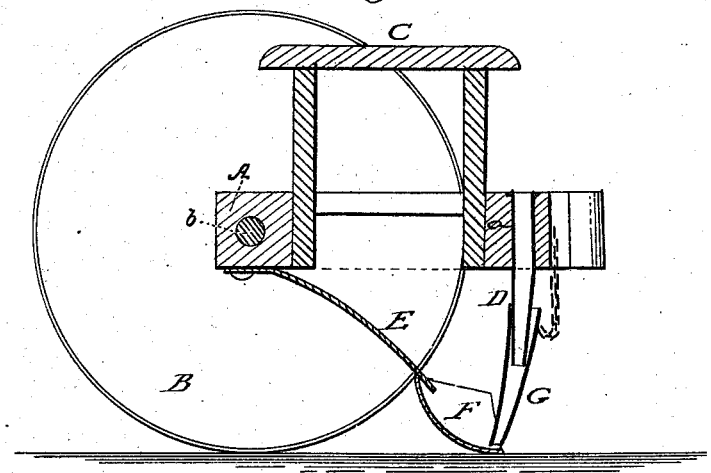
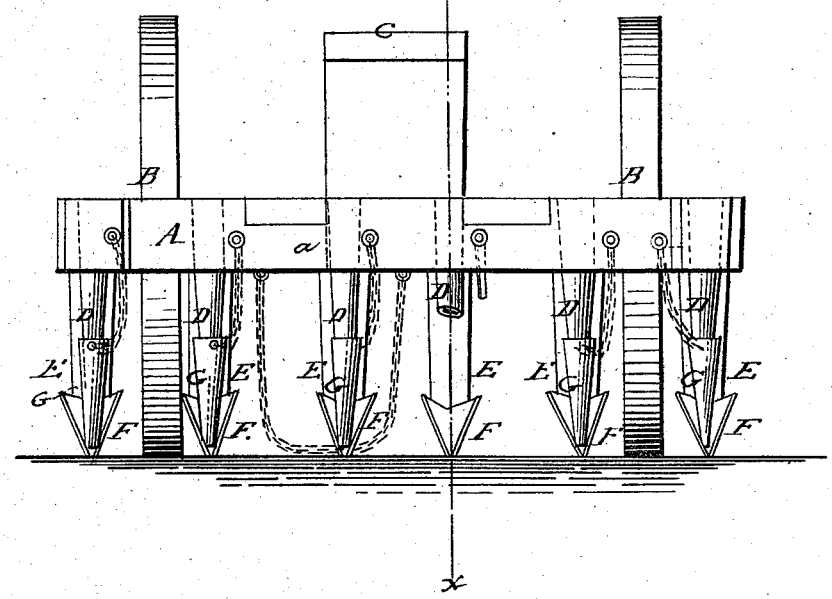
WITNESSES:
INVENTOR:

JOHN T. LYNAM, OF JEFFERSONVILLE, INDIANA.

Letters Patent No. 83,517, dated October 27, 1868.

IMPROVEMENT IN GRAIN-DRILLS.

The Schedule referred to in these Letters Patent and making part of the same.

*To all whom it may concern:*

Be it known that I, JOHN T. LYNAM, of Jeffersonville, in the county of Clarke, and State of Indiana, have invented a new and useful Improvement in Grain-Drills; and I do hereby declare that the following is a full, clear, and exact description thereof, which will enable those skilled in the art to make and use the same, reference being had to the accompanying drawings, forming part of this specification.

This invention relates to a new and useful improvement in grain-drills, and it consists in a peculiar construction of the same, as hereinafter fully shown and described, whereby the grain will not be so liable as hitherto to be injured and thrown out of the earth by frost during extreme winters.

In the accompanying sheet of drawings—

Figure 1 is a vertical section of my invention, taken in the line $x\,x$, fig. 2.

Figure 2, a rear elevation of the same.

Similar letters of reference indicate corresponding parts.

A represents a rectangular frame, which is mounted on two wheels, B B, and has a driver's seat, C, upon it.

D represents a series of tubes, which are secured permanently in the rear cross-bar, $a$, of the frame A; and E represents a series of flat springs, the front ends of which are attached to the front cross-bar, $b$, of the frame.

To the rear ends of the springs E, coulters, F, are attached, one to each.

These coulters are of V-form in their transverse section, as shown clearly in fig. 2, and have a sharp edge at the angle formed at the junction of their sides, said edge coming up in front like the runner of a sled. (See fig. 1.)

To the rear end of each coulter, a tube, G, is attached, said tubes extending upward, and receiving the lower parts of the fixed tubes D.

The springs E have a tendency to keep the coulters down to their work, and at the same time admit of the same rising and falling, to conform to the inequalities of the ground over which they may pass.

The coulters form furrows, into which the seed is dropped through the tubes D G, any suitable seed-distributing device being used.

The ordinary seed-drilling machines have no means for making furrows which will remain in the ground, provision being only made for covering the seed lightly.

In consequence of this, the grain is thrown out of the ground in extreme winters.

By my improvement, furrows are made of sufficient depth to protect the seed.

The coulters will pass through or cast aside weeds or trash, so as to insure in all cases the seed being deposited in suitable deep ridges or furrows.

The tubes G, it will be seen, rise and fall with the coulters, and consequently the proper conveyance of the seed into the furrows is not at all interfered with by the movement of the coulters in passing over uneven or undulating ground.

I claim as new, and desire to secure by Letters Patent—

The combination and arrangement of the cutters F, springs E, and the tubes D G, all applied to a seed-drilling machine, to operate in the manner substantially as and for the purpose set forth.

The above specification of my invention signed by me, this 25th day of April, 1868.

JOHN T. LYNAM.

Witnesses:
ALEXANDER BOGGS,
GEO. D. WILLIAMSON.